United States Patent Office 3,297,804
Patented Jan. 10, 1967

3,297,804
METHOD OF FILLING HARD CAPSULES WITH GRANULES BY THE OPEN-MOUTH-DOWN PUNCHING METHOD
Nobumasa Iwamoto, Fuse, Akihide Nakano, Kishiwada, and Yoshitatsu Imanishi, Osaka, Japan, assignors to Ono Pharmaceutical Co., Ltd., Osaka, Japan
No Drawing. Filed May 19, 1964, Ser. No. 368,740
2 Claims. (Cl. 264—118)

This invention relates to a method for packing hard capsules with different granules which will adhere to each other, by the so-called "open-mouth-down" punching method of capsule packing.

One method heretofore in use for packing hard capsules with solid drugs is one whereby the drugs in the form of powder or small granules are placed in a layer and packed either by machine or by hand by pressing the mouth of the capsules downward into the powder or granules. But, unlike powder drugs, small granules or pills tend to slip out of the capsules. Thus, the capsules are not satisfactorily filled.

Another method which is normally used is one in which the granules are dropped into the capsule, the open end being in an upward position. However, when packing one capsule with two or more different granules, vibration produced in the packing, storage and transportation will separate the granules, which beforehand have been well mixed by a machine, to a non-uniform state if there is any difference in grain size and apparent density among the granules.

This invention has for its object the provision of a method for packing hard capsules with granules by the open-mouth-down punching method of capsule packing, whereby hard capsules can be filled with their mouth downward without the granules dropping out of the capsules and, at the same time, maintaining a uniform distribution of different kinds of granules even if they are different in grain size and apparent density. Also the present method provides dimensional stability of granules in globular, cylindrical, cubical and other shapes, no deterioration in quality of contained drugs and no reduction in commercial value of the hard capsules so packed.

More particularly in the present method the granules are covered with a powdered or a liquefied wax or solid oily substance having a melting point of less than 100° C. In addition, the aforesaid material can be in a solution in a non-toxic solvent or in a highly viscous and adhesive substance such as glycerin, polyethylene glycol, or liquid paraffin, if necessary, with heat. The granules thus produced are suitably adhesive, and thereafter the granules are packed into hard capsules in a conventional manner. When a substance having a melting point above normal temperature is used, the packing is carried out while the surface of the granules is tacky.

The present invention is illustrated by the following examples.

*Example 1*

3 kg. of assorted vitamins granules consisting of a mixture of 1 kg. of red granules with a diameter of 0.6 to 1.2 mm. and apparent density of 0.5 to 0.6, 1 kg. of yellow sugar-coated granules with a diameter of 1.0 to 1.5 mm. and apparent density of 0.8 to 1.0, and 1 kg. of white granules with a diameter of 0.8 to 1.2 mm. and apparent density of 0.5 to 0.6 are placed in a coating pan. 90 grams of head liquefied beeswax is evenly sprayed with a spray-gun over the granules while the latter are well mixed. The treated granules are packed into hard capsules No. 0 the open ends of which are pointing downward by an automatic hard-capsule packing machine.

*Example 2*

2 kg. of lactose granules consisting of a mixture of 1 kg. of red sugar-coated granules with a diameter of 1.0 to 1.5 mm. and apparent density of 0.8 to 1.0 and 1 kg. of white granules with a diameter of 0.6 to 1.2 mm. and apparent density of 0.5 to 0.6 are placed in a coating pan. 40 g. of heat liquefied tristearin and 3 g. of liquid paraffin added thereto are evenly sprayed with a spray-gun over the granules while the granules are being mixed. After spraying, the granules are packed into hard capsules No. 1, the open ends of which are pointing downward, by an automatic hard-capsule packing machine.

*Example 3*

To 2 kg. of lactose granules with a diameter of 0.6 to 1.2 mm. are added 70 g. of powdered beeswax. The mixture is mixed thoroughly and heated to 40 to 50° C. to give sufficient tackiness to the granules. Then hard

TABLE 1

[Weight variation in contents of hard capsules packed with granules]

| | Example 1 content wt. (mg.) | Example 2 content wt. (mg.) | Example 3 content wt. (mg.) | Example 4 content wt. (mg.) | Example 5 content wt. (mg.) |
|---|---|---|---|---|---|
| 1 | 528.4 | 343.6 | 554.2 | 458.2 | 305.9 |
| 2 | 509.5 | 304.1 | 590.0 | 430.0 | 298.4 |
| 3 | 544.2 | 325.2 | 547.5 | 475.8 | 289.3 |
| 4 | 535.7 | 321.0 | 565.8 | 478.7 | 289.4 |
| 5 | 501.3 | 313.2 | 571.8 | 481.1 | 324.6 |
| 6 | 506.9 | 311.1 | 551.0 | 489.1 | 293.1 |
| 7 | 511.1 | 308.9 | 562.5 | 479.9 | 273.4 |
| 8 | 529.5 | 314.7 | 552.2 | 472.0 | 305.4 |
| 9 | 524.0 | 335.2 | 550.3 | 478.8 | 286.9 |
| 10 | 527.6 | 314.0 | 553.6 | 479.0 | 294.6 |
| 11 | 503.0 | 333.0 | 540.5 | 463.2 | 293.0 |
| 12 | 526.0 | 313.0 | 544.9 | 472.7 | 301.4 |
| 13 | 518.1 | 337.4 | 556.4 | 480.0 | 304.0 |
| 14 | 494.4 | 308.8 | 572.7 | 468.5 | 291.5 |
| 15 | 546.1 | 331.2 | 564.9 | 506.8 | 291.2 |
| 16 | 522.5 | 318.8 | 580.5 | 463.0 | 284.4 |
| 17 | 506.0 | 309.1 | 543.4 | 466.0 | 289.8 |
| 18 | 511.9 | 306.3 | 556.8 | 463.7 | 298.6 |
| 19 | 525.6 | 314.8 | 561.6 | 478.6 | 310.8 |
| 20 | 508.3 | 312.2 | 554.0 | 475.5 | 294.5 |
| Mean value | 519.0 | 318.8 | 558.7 | 473.0 | 296.0 |
| Maximum value minus mean value | +27.1 | +25.0 | +31.3 | +33.8 | +28.6 |
| Minimum value minus mean value | −24.6 | −14.7 | −18.2 | −43.0 | −22.6 | capsules No. 0, the open ends of which are pointing downward, are packed with said granules by hand.

Example 4

To 1 kg. of assorted vitamins granules having a diameter of 0.6 to 1.5 mm. are added 20 g. of polyethylene glycol 400 and 30 g. of glycerin, and the thus-produced material is then well mixed. The granules are packed by automatic hard-capsule packing machine into hard capsules No. 0, the open ends of which are pointing downward.

Example 5

A solution of 20 g. of beeswax in trichloroethylene is well mixed having 1 kg. of lactose granules with a diameter of 0.6 to 1.2 mm. The treated granules, immediately upon drying, are poured into hard capsules No. 1, the open ends of which are pointing upward, for packing.

TABLE 2

The degree of mixing of granules within capsules containing two and three different kinds of granules.

|  | Example 1 | | | Example 2 | |
| --- | --- | --- | --- | --- | --- |
|  | Red granule content per capsule (mg.) | Yellow granule content per capsule (mg.) | White granule content per capsule (mg.) | Red granule content per capsule (mg.) | White granule content per capsule (mg.) |
| 1 | 180.7 | 167.3 | 180.4 | 171.6 | 172.0 |
| 2 | 172.9 | 173.3 | 163.3 | 148.0 | 156.1 |
| 3 | 188.1 | 168.8 | 187.3 | 160.0 | 165.2 |
| 4 | 164.7 | 184.9 | 186.1 | 159.1 | 161.9 |
| 5 | 168.5 | 168.4 | 164.4 | 158.1 | 155.1 |
| 6 | 175.7 | 169.8 | 161.4 | 156.8 | 154.3 |
| 7 | 176.2 | 165.4 | 169.5 | 159.7 | 149.2 |
| 8 | 187.9 | 168.7 | 172.9 | 156.1 | 158.6 |
| 9 | 182.1 | 172.6 | 169.3 | 170.2 | 165.0 |
| 10 | 164.0 | 184.3 | 179.3 | 155.3 | 158.7 |
| 11 | 176.8 | 166.8 | 159.4 | 167.1 | 165.9 |
| 12 | 174.3 | 171.1 | 180.6 | 156.9 | 156.1 |
| 13 | 163.4 | 183.7 | 171.0 | 167.5 | 169.9 |
| 14 | 170.6 | 160.3 | 163.5 | 159.4 | 169.4 |
| 15 | 183.3 | 182.7 | 180.1 | 160.8 | 170.4 |
| 16 | 186.1 | 167.5 | 168.9 | 162.4 | 156.4 |
| 17 | 162.3 | 171.5 | 172.2 | 152.9 | 156.2 |
| 18 | 178.0 | 166.9 | 167.0 | 153.7 | 152.6 |
| 19 | 175.5 | 174.6 | 175.5 | 159.5 | 155.3 |
| 20 | 167.6 | 165.7 | 175.0 | 160.2 | 152.0 |
| Mean value | 174.9 | 171.7 | 172.4 | 159.8 | 160.0 |
| Maximum value minus mean value | +13.2 | +13.2 | +14.9 | +11.8 | +12.0 |
| Minimum value minus mean value | −12.6 | −11.4 | −13.0 | −11.8 | −10.8 |

TABLE 3.—CONTROL

Granules, which are not tacky, are dropped into capsules, the open ends of which are upward.

The degree of mixing of granules within capsules containing two and three different kinds of granules is shown in the following.

|  | Control of Example 1 | | | Control of Example 2 | |
| --- | --- | --- | --- | --- | --- |
|  | Red granule content per capsule (mg.) | Yellow granule content per capsule (mg.) | White granule content per capsule (mg.) | Red granule content per capsule (mg.) | White granule content per capsule (mg.) |
| 1 | 159.3 | 121.3 | 161.8 | 107.3 | 134.4 |
| 2 | 193.8 | 88.8 | 137.0 | 97.1 | 146.4 |
| 3 | 190.6 | 104.9 | 113.6 | 106.9 | 136.2 |
| 4 | 121.0 | 161.7 | 114.3 | 117.5 | 122.6 |
| 5 | 173.5 | 89.8 | 144.6 | 136.5 | 130.6 |
| 6 | 190.1 | 95.4 | 145.1 | 120.8 | 82.0 |
| 7 | 98.9 | 118.7 | 176.8 | 102.4 | 132.0 |
| 8 | 142.2 | 196.9 | 122.3 | 91.2 | 149.2 |
| 9 | 177.0 | 104.3 | 132.9 | 103.7 | 125.1 |
| 10 | 157.5 | 116.8 | 165.7 | 82.4 | 141.9 |
| 11 | 100.6 | 141.1 | 143.2 | 110.2 | 125.1 |
| 12 | 160.4 | 103.7 | 122.3 | 121.6 | 104.3 |
| 13 | 93.3 | 190.3 | 139.5 | 98.0 | 109.2 |
| 14 | 167.3 | 88.4 | 175.3 | 141.7 | 85.5 |
| 15 | 176.1 | 74.2 | 155.0 | 99.1 | 125.0 |
| 16 | 188.4 | 101.5 | 131.2 | 118.1 | 98.7 |
| 17 | 87.4 | 186.9 | 126.9 | 116.8 | 125.9 |
| 18 | 149.5 | 104.6 | 183.1 | 129.7 | 79.9 |
| 19 | 152.9 | 125.7 | 136.5 | 100.2 | 120.9 |
| 20 | 169.3 | 117.3 | 149.6 | 96.1 | 129.4 |
| Mean value | 152.5 | 121.6 | 143.8 | 109.9 | 120.2 |
| Maximum value minus mean value | +41.3 | +75.3 | +39.3 | +31.8 | +29.0 |
| Minimum value minus mean value | −65.1 | −47.4 | −29.5 | −27.5 | −40.3 |

The foregoing Table 1 shows that the method of this invention ensures that the weight of the granules in each capsule does not vary more than 10% from the average weight.

The method of this invention, compared with the method set forth in Table 3, increases the amount of granules per capsule by 10% to 40%.

Table 2 demonstrates that when a mixture of two or three kinds of granules in equal quantities is placed in a capsule by the method of this invention, the mixture is uniform in each capsule.

What we claim is:

1. In the method of packing capsules with a mixture of at least two different types of granules by the open-mouth-down punching method of capsule packing, the improvement according to which the granules are preliminarily first evenly coated with a motlen material selected from the group consisting of wax, tristearin and glycerin, thereby rendering the granules tacky, and then homogeneously admixed with each other, and the resultant mixture thereafter packed into capsules by the aforesaid method.

2. In the method of packing capsules with a mixture of at least two different types of granules by the open-mouth-down punching method of capsule packing, the improvement according to which the granules are preliminarily first intimately admixed with each other and with a material selected from the group consisting of wax, tristearin and glycerin, and then the thus-formed mixture is heated to melt the said material and thereby to coat the granules with a tacky coating of said material, and the resultant mixture thereafter packed into capsules by the aforesaid method.

References Cited by the Examiner

UNITED STATES PATENTS

| | | | |
|---|---|---|---|
| 2,956,926 | 9/1960 | Greif | 167—83 |
| 2,963,402 | 12/1960 | Nalin et al. | 167—83 |
| 3,197,369 | 7/1960 | Widmann et al. | 167—83 |

OTHER REFERENCES

Husa, W. J.: Pharmaceutical Dispensing, 3rd ed., Husa Brother, Iowa City, Iowa, 1947, pp. 44–45.

Jenkins, Francke, Brecht, Sprandio: The Art of Compounding, 9th ed., McGraw-Hill Book Co., New York, 1957, pp. 58–60.

ROBERT F. WHITE, *Primary Examiner.*

J. R. HALL, *Assistant Examiner.*